Aug. 29, 1933.   I. F. SCHRECK   1,924,885
SELF LOADING AND UNLOADING TRUCK
Filed July 11, 1931   2 Sheets-Sheet 1

INVENTOR
Irvin F. Schreck.
BY Frank S. Greene
ATTORNEY

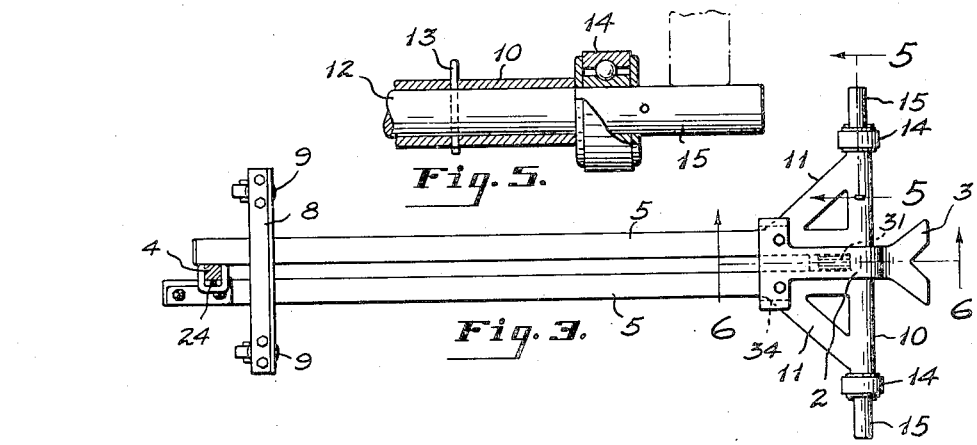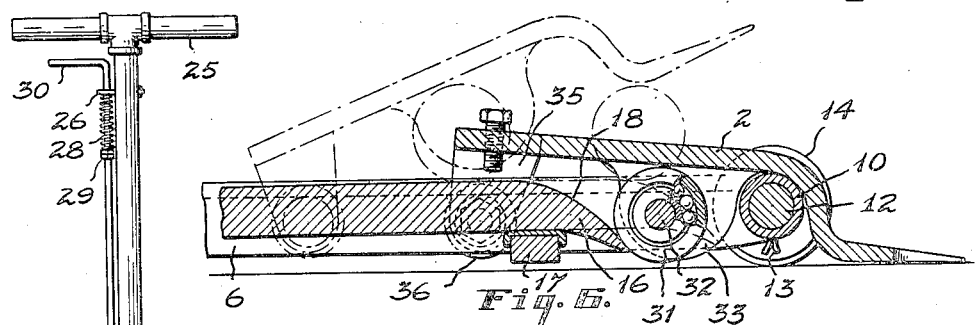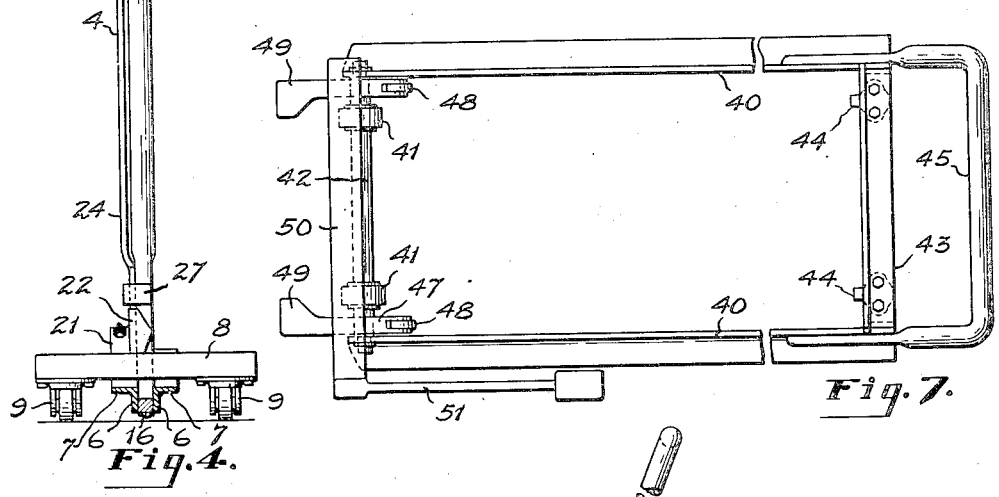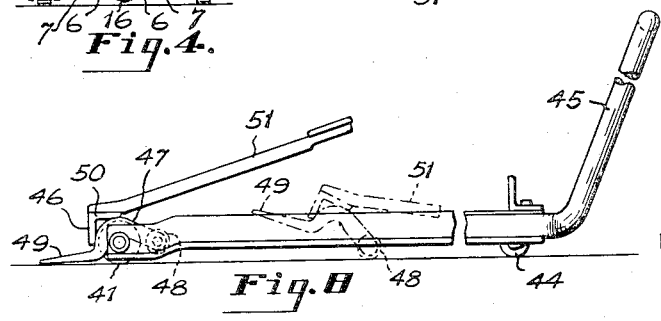

Patented Aug. 29, 1933

1,924,885

UNITED STATES PATENT OFFICE 1,924,885

SELF LOADING AND UNLOADING TRUCK

Irvin F. Schreck, East Cleveland, Ohio

Application July 11, 1931. Serial No. 550,126

18 Claims. (Cl. 214—65)

This invention relates to hand trucks suitable for the handling of boxes, crates, bales, and the like, and has for its object to provide a truck which has means for quickly and easily transferring the boxes, crates, bales or the like from the floor onto the truck and from the truck onto the floor.

A further object is to provide a hand truck which has a load tilting lifter mounted to travel longitudinally of the truck frame and which has means for actuating the lifter to tilt a load, the lifter and actuating means being so designed that the truck frame may be moved forwardly under or rearwardly out from under the tilted box, bale, crate or the like while it is held in a tilted position by the lifter.

A further object of the invention is to provide a hand truck of the character above described which has a combined push handle and actuating lever which serves as a handle for pushing the truck about and also as an actuating lever for the load tilting lifter.

A further object of the invention is to provide a movably mounted, load tilting lifter which is mounted to travel longitudinally of the truck frame and which is supported upon an adjustable track member which may be shifted to raise or lower the lifter.

With the above and other objects in view, the invention may be said to comprise the truck as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification, in which:

Fig. 3 is a section taken on the line indicated at 3—3 in Fig. 1;

Fig. 4 is a section taken on the line indicated at 4—4 in Fig. 1;

Fig. 5 is a section taken on the line indicated at 5—5 in Fig. 3;

Fig. 6 is a section taken on the line indicated at 6—6 in Fig. 3;

Fig. 7 is a fragmentary plan view showing a truck of slightly modified construction;

Fig. 8 is a fragmentary side elevation of the truck shown in Fig. 7;

Figure 1:
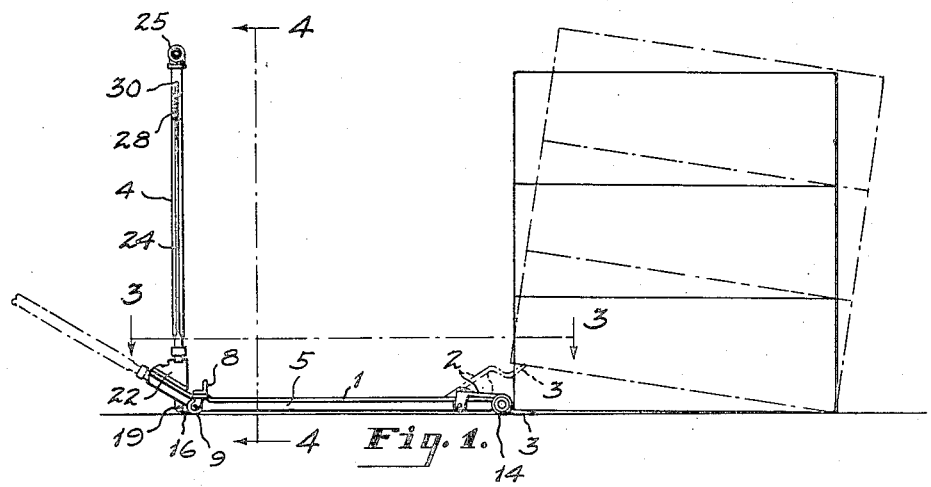
Fig. 1 is a side elevation showing a hand truck embodying the present invention in engagement with a load to be transported which is resting on the floor.
Figure 2:
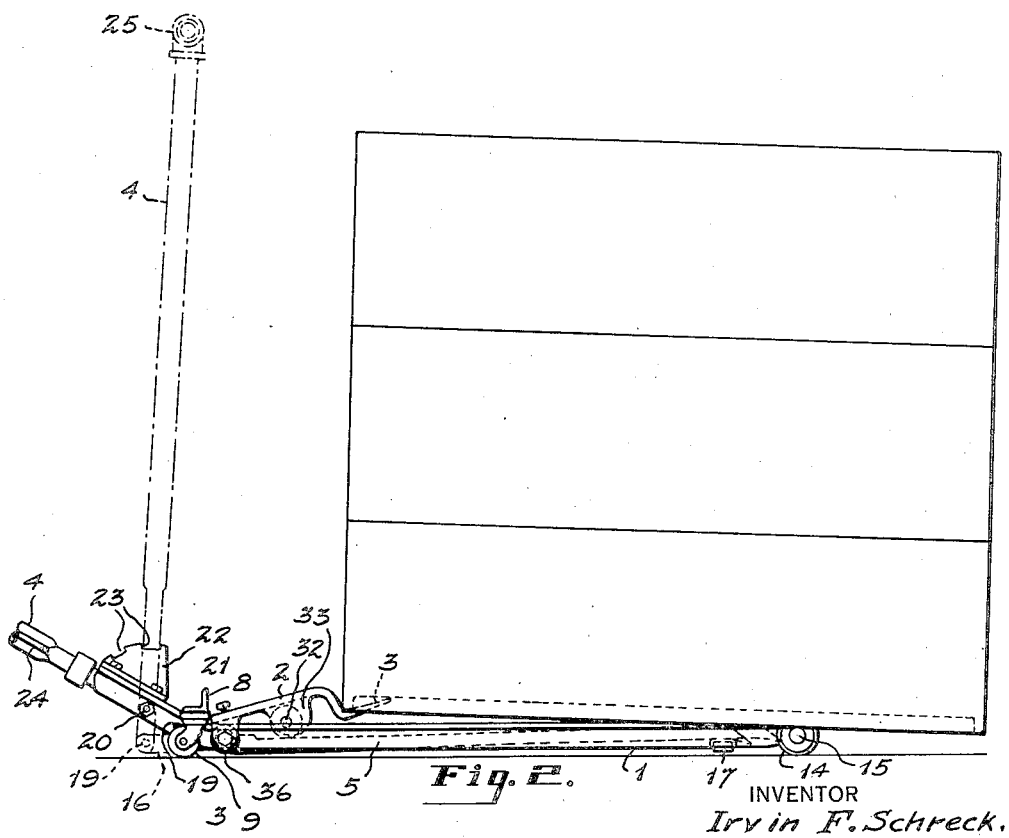
Fig. 2 is a side elevation showing the truck frame advanced beneath the load to be transported.

Referring to the accompanying drawings, the hand truck of the present invention comprises a relatively low load carrying frame 1 upon which there is mounted a load tilting lifter in the form of a carriage 2 which is adapted to travel forwardly and rearwardly on the frame 1. The carriage 2 is mounted to rock vertically about an axis adjacent its rear end and has a downwardly offset load engaging member 3 at its forward end which is adapted to overhang the forward end of the frame 1 with its forward edge in close proximity to the floor from which the load is to be picked up. At the rear end of the frame 1 there is a combined push handle and actuating lever 4 which, as will hereinafter be more fully explained, serves to rock the load tilting carriage 2 to shift the same from the full line position shown in Fig. 1 to the dotted line position in which the downwardly offset load engaging member 3 is positioned clear of the frame 1 and the load is tilted with the end thereof adjacent the forward end of the truck frame elevated a substantial distance above the truck frame. The rocking of the carriage 2 to elevate the load engaging member 3 is effected by swinging the handle 4 rearwardly to the dotted line position shown in Fig. 1, and, since the carriage 2 is mounted to travel freely on the frame 1, the frame 1 may then be advanced beneath the tilted load by pushing forwardly on the handle 4, advancing the frame under the load to the position shown in Fig. 2, whereupon the handle 4 may be swung back to its upright position, causing the load to be lowered onto the truck frame 1, thereby transferring the load from the floor onto the truck frame.

In depositing the load from the truck onto the floor the handle 4 is swung rearwardly to elevate the lifting member 3 and tilt the load forwardly to cause the forward end thereof to engage the floor, whereupon the truck may be pulled rearwardly, causing the truck frame 1 to be pulled out from under the load while the carriage 2 supporting the rear end of the load travels forwardly on the frame. When the carriage 2 has reached the forward end of the frame 1 the handle 4 may be swung to upright position to lower the load engaging member 3 to the floor in advance of the front end of the frame 1, whereupon the truck may be backed away from the load.

As shown in Figs. 3 and 4 of the drawings, the frame 1 consists of two main longitudinal angle bars 5 which are spaced a short distance apart and are arranged with flanges 6 back to back and flanges 7 at the top and projecting outwardly from the flanges 6. The angle bars 5 are connected adjacent their rear ends by a cross bar 8 which projects beyond the flanges 7 and has casters 9 attached to the projecting ends thereof. A transverse axle sleeve 10 extends across the forward end of the bars 5 and is attached by suitable means such as welding to the ends of the bars 5 and to angle braces 11 which converge rearwardly from the ends of the sleeve to the frame bars 5. An axle 12 fits in the sleeve 10 and is secured therein by suitable means such as a cotter pin 13. At the ends of the sleeve 10 the axle 12 carries wheels 14 which are preferably in the form of ball bearings, the inner races of which are secured to the axle and the outer races of which form the wheel tread. The axle 12 has portions 15 projecting beyond the wheels 14 for engagement with skids or cleats attached to opposite bottom edges of boxes or crates which are being handled. It is a common expedient to provide boxes, crates and other containers with cleats along opposite bottom edges which support the bottom of the container slightly above the floor and facilitate the sliding of the container on the floor. The wheels 14 may be placed a distance apart such that they will pass between the cleats of the container which may then be supported on the truck frame with the cleats resting on the projecting portions 15 of the axle.

Between the angle bars 5 there is a track bar 16 which is mounted for endwise and tilting movements. The forward end of the bar 16 is slidably mounted on a cross bar 17 attached to the bars 5 adjacent their forward ends and extending across the space between the lower edges of flanges 6. The forward end of the track bar 16 is bent downwardly and tapered to provide an incline 18. The rear end of the track bar 16 is supported by the combined push handle and actuating lever 4 being connected to the lower end of the lever by a pivot 19. The lever 4 is connected a short distance above the pivot 19 by a pivot 20 to a bracket 21 attached to the rear end of one of the frame bars 5. The bracket 21 has an arcuate vertically disposed flange 22 disposed alongside the lever 4 and this arcuate flange is provided with spaced peripheral notches 23 which are adapted to be engaged by a detent in the form of a rod 24 carried by the handle 4.

The handle 4 which has a cross bar 25 at its outer end to provide hand grips for pushing the truck is provided with upper and lower guides 26 and 27 in which the rod 24 is slidably mounted. The rod 24 is pressed toward engaging position by means of a spring 28 mounted on the bar and interposed between the upper guide 26 and a collar 29 on the bar and terminates in an outwardly bent end 30 closely adjacent the cross bar 25, the outwardly bent end 30 being so disposed with respect to the cross bar 25 that it may be gripped with the hand grasping the adjacent portion of the cross bar, so that the lever 4 may be quickly and easily released and swung from one adjusted position to another.

The load tilting carriage 2 is provided with a supporting wheel 31 intermediate its ends which is mounted on an axle 32 carried by depending flanges 33 formed integrally with the body of the carriage. The wheel 31 is preferably a roller bearing having its inner race fixed to the axle and its outer race forming the tread of the wheel. The supporting wheel 31 is positioned to travel upon the movable track bar 16 and rearwardly of the supporting wheel 31 the carriage has a widened portion 34 provided with downwardly extending flanges 35 which straddle the frame bars 5 and support small wheels 36 which are also preferably in the form of ball bearings and which roll upon the under sides of the flange 7. In its travel forwardly and rearwardly on the frame 1 the carriage 2 is supported as a wheel 31 on the track bar 16 and the rear end of the carriage is guided and held against upward movement by the wheels 36 traveling on the under side of the flanges 6 of the frame bars 5 which serve as fixed tracks for guiding the carriage in its travel on the frame.

When the track bar 16 is in its retracted position and the carriage 2 is at its forward limit of movement, the forward end of the track bar 16 is spaced rearwardly from the front end of the frame 1 a sufficient distance to permit the supporting wheel 31 of the carriage 2 to occupy the space between the forward end of the track bar 16 and the axle sleeve 10 with the body of the carriage 2 resting on the sleeve 10. The forward end of the carriage 2 is so formed that the axle sleeve 10 is received in the space between the wheel 31 and the downwardly offset load engaging member 3, so that, in this position of the carriage, the overhanging load engaging member 3 holds the carriage against rearward movement and the load engaging member lies in proximity to the surface of the floor so that it can be shoved under a load to be transferred to the truck.

When the combined handle and lever 4 is swung rearwardly from its upright position the track bar 16 is shoved forwardly and its inclined forward end 18 engages the wheel 31 and wedges the wheel upwardly rocking the carriage 2 about the axis of the wheels 36. This movement of the load tilting carriage 2 lifts the load engaging member 3 a substantial distance above the frame 1 and brings the supporting wheel 31 of the carriage upon the flat top of the track bar 16. With the track bar 16 in this position the carriage 2 will travel freely in a rearward direction on the track bars 5 and 16 and if a load to be transferred to the truck be supported at one end upon the lifting member 3 as shown in dotted lines in Fig. 1, the truck may be pushed in a forward direction by means of the handle 4 and the truck frame 1 will be advanced while the load tilting carriage 2 is held against forward movement by the tilted load until the frame 1 has been moved under the load a sufficient distance to bring the forward end of the truck frame beyond the center of gravity of the load. The handle 4 may then be swung to upright position, which will cause the rear end of the track bar 16 to be lowered, allowing the load engaging member 3 to move downwardly and causing the load to be lowered into engagement with the frame 1 and be deposited thereon.

To unload the truck the handle 4 is again swung downwardly, raising the rear end of the track bar 16 and elevating the load engaging member 3 sufficiently to tilt the forward end of the load into engagement with the floor, whereupon the truck may be pulled rearwardly by means of the handle 4. When a rearward pull is exerted on the truck the load tilting carriage 2 is held stationary by the weight imposed thereon and the frame 1 moves out from under the load until the forward end of the frame is beneath the carriage 2. The handle 4 may then be swung to vertical position which will cause the forward end of the track bar 16 to be withdrawn from beneath the supporting roller 31 of the carriage 2, causing the roller 31 to travel down the incline 18 and lower the load supporting member 3 to the floor. The truck may then be backed away from the load and is ready for engagement with another load to be transferred to the truck.

It will also be observed that the combined actuating lever and push handle 4 after it has been swung downwardly to tilt the load occupies the position which is most convenient for exerting a forward thrust or backward pull on the truck frame 1 and that after the handle 4 has been returned to upright position, the operator in pushing the loaded truck over the floor may walk close to the truck with a hand on the load to steady it.

When it is desired to handle bales, containers or the like which lie flat upon the floor, it is desirable that the frame 1 be so constructed that its forward end has a top surface above the peripheries of the forward supporting wheels, so that when the container or bale is lowered onto the truck it will engage the frame and be supported clear of the supporting wheels.

In Figs. 7 and 8 of the drawings there is shown a truck frame having side bars 40, the top edges of which are slightly above the supporting wheels 41 so that, when the load is lowered onto the frame it will rest upon the frame bars 40, leaving the wheels 41 free to rotate.

The side bars 40 are connected at the front by an axle 42 which carries the front supporting wheels 41 and at the rear by a cross bar 43 to which casters 44 are attached, a handle 45 being rigidly attached to the rear end of the frame for pushing the truck.

The truck shown in Figs. 7 and 8 has a lifter carriage 46 which is mounted to travel longitudinally of the frame and this carriage consists of a pair of bars 47 which have a portion arched to overhang the axle 42 and which have supporting wheels 48 attached to their rear ends and adapted to travel on the floor and forwardly projecting load engaging members 49 which are disposed in proximity to the floor surface when the carriage is in its forward position overhanging the axle. The bars 47 are positioned close to the inner sides of the frame side bars 40 and are connected by an angle bar 50 which is rigidly attached to the bars 47. One end of the bar 50 projects past one of the side bars 40 of the truck frame and has an actuating lever rigidly attached thereto in the form of a rearwardly extending treadle arm 51.

In the operation the truck shown in Figs. 7 and 8 the lifting member is entered beneath the end of a box, bale or other load by pushing the truck forwardly against the load and the operator standing beside the truck depresses the treadle 51, causing the carriage 46 to rock on the axle 42 until the wheels 48 engage the floor after which the carriage fulcrums about the axis of the wheels 48 and the load engaging members 49 swing upwardly to a position clear of the axle 42, tilting the load sufficiently to permit the truck frame to be advanced beneath it. The operator then grasps the rigid handle 45 and pulls the truck frame forwardly beneath the load, the carriage 46 remaining stationary during the forward movement of the truck frame. After the truck frame has been positioned beneath the load the treadle 51 is released, allowing the load to tilt onto the truck frame as the carriage 46 swings down to a position in which the projecting end of the cross bar 50 rests upon a side frame member.

To deposit a load from the truck onto the floor, the treadle arm 51 is depressed to again tilt the load to bring the forward end thereof into engagement with the floor and lift the same clear of the truck frame whereupon the truck frame may be pulled rearwardly out from under the load causing the carriage 46 which is guided between the side bars 40 to be advanced relative to the truck frame to its forward position over the axle, so that, when the treadle arm 51 is released the load will be lowered to the floor and the carriage 46 will rest on the axle 42 in position for engagement with another load.

It will be apparent that the present invention provides a truck of very simple and sturdy construction which has means for quickly transferring the bales, boxes, crates or the like from the floor to the truck and from the truck to the floor and that the transferring operations can be performed manually by the truck operator with a minimum of physical exertion.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A truck comprising a main carriage having a relatively low load supporting frame, a load tilting carriage mounted to travel forwardly and rearwardly of the frame and having a load engaging member adapted to overhang the forward end of said frame in the forward position of the load tilting carriage, said member being movable up and down independently of the frame in the forward position of the carriage to raise or lower a load and means for raising and lowering said load engaging member, said main carriage being movable relative to the auxiliary carriage while the auxiliary carriage remains stationary with the load.

2. A truck comprising a main carriage having a relatively low load supporting frame, a load tilting carriage mounted to travel forwardly and rearwardly of the frame and having a load engaging member adapted to overhang the forward end of said frame in the forward position of the load tilting carriage, a lever pivoted to the rear end of said frame, and means operated by said lever for raising and lowering said load engaging member.

3. A truck comprising a main carriage having a relatively low load supporting frame, said frame having a fixed longitudinal track and an adjustable longitudinal track, a load tilting carriage having a rear portion guided by said fixed track and a forward portion guided by the adjustable track, said forward portion of the load tilting carriage having a downwardly offset load engaging portion, and means for shifting said adjustable track to raise or lower the forward portion of the load tilting carriage.

4. A truck comprising a main carriage having a relatively low load supporting frame, said frame having a fixed longitudinal track and an adjustable longitudinal track, a load tilting carriage having a supporting wheel intermediate its ends which travels on said adjustable track and a wheel rearwardly of the supporting wheel which travels upon the under side of said fixed track, said load tilting carriage having a downwardly offset load engaging member forwardly of the supporting wheel, and means for shifting said adjustable track to raise or lower the forward portion of the load tilting carriage.

5. A truck comprising a main carriage having a relatively low load supporting frame, said frame having a fixed longitudinal track and an adjustable longitudinal track, a load tilting carriage having a supporting wheel intermediate its ends which travels on said adjustable track and a wheel rearwardly of the supporting wheel which travels upon the under side of said fixed track, said load tilting carriage having a downwardly offset load engaging member forwardly of the supporting wheel, and a lever pivoted to the rear end of said frame and connected to said adjustable track for shifting the same.

6. A truck comprising a main carriage having an elongated load supporting frame, an auxiliary carriage mounted to travel longitudinally of said frame, said auxiliary carriage being tiltable independently of the frame about a transverse axis and having a forwardly projecting load engaging member, and means for tilting the auxiliary carriage to elevate the load engaging member and for holding the same in a tilted position, said main carriage being movable relative to the auxiliary carriage while the auxiliary carriage remains stationary with the load.

7. A truck comprising a main carriage having an elongated load supporting frame, an auxiliary carriage mounted to travel longitudinally of said frame, said auxiliary carriage being tiltable about a transverse axis and having a forwardly projecting load engaging member, a lever pivoted to the rear end of the load supporting frame, and means operated by said lever for tilting said carriage to raise or lower the load engaging member, said main carriage being movable relative to the auxiliary carriage while the auxiliary carriage remains stationary with the load.

8. A truck comprising a main carriage having an elongated relatively low supporting frame, said frame having a fixed longitudinal track and an adjustable track mounted for longitudinal and tilting movements in the frame, said adjustable track having a downwardly inclined forward end, a tiltable carriage mounted to travel on said tracks, said carriage having a supporting wheel intermediate its ends which travels on the adjustable track and a portion rearwardly of the supporting wheel guided by the fixed track, said tiltable carriage having a load engaging member at its forward end, and means for actuating said adjustable track to tilt said tiltable carriage and raise or lower the load engaging member.

9. A truck comprising a main carriage having an elongated relatively low supporting frame, said frame having a fixed longitudinal track and an adjustable track mounted for longitudinal and tilting movements in the frame, said adjustable track having a downwardly inclined forward end, a tiltable carriage mounted to travel on said tracks, said carriage having a supporting wheel intermediate its ends which travels on the adjustable track and a portion rearwardly of the supporting wheel guided by the fixed track, said tiltable carriage having a load engaging member at its forward end, and a lever pivoted at its lower end to the rear end of the adjustable track and to said frame adjacent its rear end and above the adjustable track.

10. A truck comprising a main carriage having an elongated relatively low supporting frame, said frame having a fixed longitudinal track and an adjustable track mounted for longitudinal and tilting movements in the frame, said adjustable track having a downwardly inclined forward end, a tiltable carriage mounted to travel on said tracks, said carriage having a supporting wheel intermediate its ends which travels on the adjustable track and a portion rearwardly of the supporting wheel guided by the fixed track, said tiltable carriage having a load engaging member at its forward end, a lever pivoted at its lower end to the rear end of the adjustable track and to said frame adjacent its rear end and above the adjustable track, and means for releasably holding said lever in adjusted positions, said lever having a hand grip portion and serving as a handle for pushing the truck.

11. A truck comprising a dirigible load supporting frame, a load lifting member mounted to travel forwardly and rearwardly of the frame and having a load engaging portion movable vertically with respect to the frame and adapted to overhang the forward end of the frame in the forward position of the lifting member, and means for elevating the load engaging portion of said lifting member to tilt a load engaged thereby and to position the load engaging portion clear of the frame so that the frame may be advanced beneath the tilted load while the lifting member remains stationary with the load and for lowering the said load engaging portion to deposit the load on the frame.

12. A truck comprising a main carriage comprising a load supporting frame having supporting wheels at its forward and rear ends, a fixed track extending longitudinally of the frame, a second track mounted for longitudinal and tilting movements in the frame, a tiltable carriage having longitudinally spaced wheels adapted to travel on the fixed and movable tracks, said carriage having a forwardly projecting load engaging member, and means for shifting the movable track to tilt the carriage.

13. A truck comprising a low horizontally disposed wheel supported load carrying frame, said frame having a pair of fixed longitudinal track bars, and a third track bar mounted between the fixed bars for longitudinal and tilting movements, the forward end of the latter track bar being downwardly inclined, a tiltable carriage having a supporting wheel adapted to travel upon the movable track bar and wheels rearwardly of the supporting wheel engaging the under sides of the fixed track bars, said tiltable carriage having a forwardly projecting load engaging member, and means for actuating the movable track bar.

14. A truck comprising a low horizontally disposed wheel supported load carrying frame, said frame having a pair of fixed longitudinal track bars, and a third track bar mounted between the fixed bars for longitudinal and tilting movements, the forward end of the latter track bar being downwardly inclined, a tiltable carriage having a supporting wheel adapted to travel upon the movable track bar and wheels rearwardly of the supporting wheel engaging the under sides of the fixed track bars, said tiltable carriage having a forwardly projecting load engaging member, and a lever pivoted at its lower end to the rear end of the movable track bar and pivoted to said frame above the track bar.

15. A truck comprising a low horizontally disposed wheel supported load carrying frame, said frame having a pair of fixed longitudinal track bars, and a third track bar mounted between the fixed bars for longitudinal and tilting movements, the forward end of the latter track bar being downwardly inclined, a tiltable carriage having a supporting wheel adapted to travel upon the movable track bar and wheels rearwardly of the supporting wheel engaging the under sides of the fixed track bars, said tiltable carriage having a forwardly projecting load engaging member, a lever pivoted at its lower end to the rear end of the movable track bar and pivoted to said frame above the track bar, and means for releasably securing said lever in adjusted positions.

16. A truck comprising a low horizontally disposed wheel supported load carrying frame, said frame having a pair of fixed longitudinally supported track bars and a third track bar between the fixed track bars and slidably supported adjacent its forward end for endwise movement in the frame, the slidable track bar having a downwardly inclined forward end, a tiltable carriage having a supporting wheel intermediate its ends adapted to travel on the slidable track bar, said tiltable carriage having a downwardly offset load engaging member forwardly of the supporting wheel and wheels rearwardly of the supporting wheel adapted to travel on the fixed tracks, a lever at the rear end of said frame pivoted to the rear end of the slidable track and to the frame above said slidable track, and means for releasably securing said lever in adjusted positions, said lever providing a push handle for the truck.

17. A truck comprising a low horizontally disposed wheel supported load carrying frame, said frame having a pair of fixed longitudinally supported track bars and a third track bar between the fixed track bars and slidably supported adjacent its forward end for endwise movement in the frame, the slidable track bar having a downwardly inclined forward end, a tiltable carriage having a supporting wheel intermediate its ends adapted to travel on the slidable track bar, said tiltable carriage having a downwardly offset load engaging member forwardly of the supporting wheel and wheels rearwardly of the supporting wheel adapted to travel on the fixed tracks, a lever at the rear end of said frame pivoted to the rear end of the slidable track and to the frame above said slidable track, said lever being movable in a rearward direction from a substantially upright position to advance the slidable track bar and move the downwardly inclined portion thereof forwardly beneath the supporting wheel of the tiltable carriage to elevate the load engaging member to a position clear of the frame and to simultaneously elevate the rear end of the track bar, and means for releasably securing said lever in adjusted positions, said lever providing a push handle for the truck.

18. A truck comprising a main carriage having a relatively low load supporting frame, an auxiliary carriage guided in said frame for travel longitudinally thereof, said auxiliary carriage being tiltable about a transverse axis and having load engaging means at its forward end, and a lever attached to said auxiliary carriage for rocking the same about said transverse axis to elevate its forward end to tilt a load, said main carriage being movable relative to the auxiliary carriage while the auxiliary carriage remains stationary with the load.

IRVIN F. SCHRECK.